(12) United States Patent
Jung et al.

(10) Patent No.: US 12,379,151 B2
(45) Date of Patent: *Aug. 5, 2025

(54) VACUUM ADIABATIC BODY AND REFRIGERATOR

(71) Applicant: LG ELECTRONICS INC., Seoul (KR)

(72) Inventors: Wonyeong Jung, Seoul (KR); Deokhyun Youn, Seoul (KR); Daewoong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 252 days.

This patent is subject to a terminal disclaimer.

(21) Appl. No.: 18/095,658

(22) Filed: Jan. 11, 2023

(65) Prior Publication Data

US 2023/0168025 A1 Jun. 1, 2023

Related U.S. Application Data

(63) Continuation of application No. 16/929,523, filed on Jul. 15, 2020, now Pat. No. 11,592,230, which is a
(Continued)

(30) Foreign Application Priority Data

Aug. 3, 2015 (KR) .................. 10-2015-0109625

(51) Int. Cl.
*F25D 19/00* (2006.01)
*F16L 59/065* (2006.01)
(Continued)

(52) U.S. Cl.
CPC .......... *F25D 23/062* (2013.01); *F16L 59/065* (2013.01); *F25D 19/006* (2013.01);
(Continued)

(58) Field of Classification Search
CPC .. F16L 59/065; F25D 19/006; F25D 2201/14; F25D 23/028; F25D 23/062; F25D 23/085; F25D 23/087
See application file for complete search history.

(56) References Cited

U.S. PATENT DOCUMENTS 1,413,169 A 4/1922 Lawton
1,588,707 A 6/1926 Csiga
(Continued)

FOREIGN PATENT DOCUMENTS

CN 1132346 10/1996
CN 1191959 9/1998
(Continued)

OTHER PUBLICATIONS

U.S. Office Action dated Mar. 18, 2024, issued in U.S. Appl. No. 18/237,531.
(Continued)

*Primary Examiner* — Filip Zec
(74) *Attorney, Agent, or Firm* — KED & ASSOCIATES, LLP

(57) ABSTRACT

A vacuum adiabatic body includes a first plate; a second plate; a seal; a support; a heat resistance unit; and an exhaust port, wherein the heat resistance unit includes a conductive resistance sheet having one end connected to the first plate member, the conductive resistance sheet resisting heat conduction flowing along a wall for the third space, the heat resistance unit further includes a side frame connected to the conductive resistance sheet, the side frame defining at least one portion of the wall for the third space, the side frame includes a first mounting surface connected to the conductive resistance sheet and a second mounting surface connected to the second plate, and the second mounting surface is supported by the support.

20 Claims, 9 Drawing Sheets

Related U.S. Application Data continuation of application No. 15/749,140, filed as application No. PCT/KR2016/008507 on Aug. 2, 2016, now Pat. No. 10,753,671.

(51) Int. Cl.
  *F25D 23/02* (2006.01)
  *F25D 23/06* (2006.01)
  *F25D 23/08* (2006.01)

(52) U.S. Cl.
  CPC ......... *F25D 23/028* (2013.01); *F25D 23/085* (2013.01); *F25D 23/087* (2013.01); *F25D 2201/14* (2013.01)

(56) References Cited

U.S. PATENT DOCUMENTS

| | | | |
|---|---|---|---|
| 1,845,353 A | 2/1932 | Snell | |
| 1,898,977 A | 2/1933 | Comstock | |
| 2,000,882 A | 5/1935 | Comstock | |
| 2,550,040 A | 4/1951 | Clar | |
| 2,708,774 A | 5/1955 | Seelen | |
| 2,715,976 A | 8/1955 | Whitmore | |
| 2,729,863 A | 1/1956 | Kurtz | |
| 2,768,046 A | 10/1956 | Evans | |
| 2,786,241 A | 3/1957 | Garvey et al. | |
| 3,091,946 A | 6/1963 | Kesling | |
| 3,161,265 A | 12/1964 | Matsch et al. | |
| 3,289,423 A | 12/1966 | Berner et al. | |
| 3,370,740 A | 2/1968 | Anderson | |
| 3,520,581 A | 7/1970 | Borghi | |
| 4,056,211 A | 11/1977 | Zumwalt | |
| 4,646,934 A | 3/1987 | McAllister | |
| 4,822,117 A | 4/1989 | Boston, Jr. | |
| 4,959,111 A | 9/1990 | Kruck et al. | |
| 5,011,729 A | 4/1991 | Mcallister | |
| 5,018,328 A | 5/1991 | Cur | |
| 5,033,803 A | 7/1991 | Katsuyoshi et al. | |
| 5,185,981 A | 2/1993 | Martinez | |
| 5,200,015 A | 4/1993 | Schilf | |
| 5,361,598 A | 11/1994 | Roseen | |
| 5,512,345 A * | 4/1996 | Tsutsumi .............. F25D 23/063 220/592.27 | |
| 5,532,034 A | 7/1996 | Kirby et al. | |
| 5,694,789 A | 12/1997 | Do | |
| 5,795,639 A | 8/1998 | Lin | |
| 5,843,353 A | 12/1998 | De Vos et al. | |
| 5,947,479 A | 9/1999 | Ostrowski | |
| 5,966,888 A * | 10/1999 | Richardson .............. E04D 3/28 52/582.1 | |
| 6,001,890 A | 12/1999 | Hamilton | |
| 6,029,846 A | 2/2000 | Hirath et al. | |
| 6,038,830 A | 3/2000 | Hirath et al. | |
| 6,109,712 A | 8/2000 | Haworth et al. | |
| 6,168,040 B1 | 1/2001 | Sautner et al. | |
| 6,192,703 B1 | 2/2001 | Salyer et al. | |
| 6,244,458 B1 | 6/2001 | Frysinger et al. | |
| 6,280,814 B1 * | 8/2001 | Offermann ............ E04B 1/8409 428/137 | |
| 6,338,536 B1 | 1/2002 | Ueno et al. | |
| 6,427,945 B1 * | 8/2002 | Bansemir .................. B64C 1/18 244/119 | |
| 6,485,122 B2 | 11/2002 | Wolf | |
| 6,485,805 B1 * | 11/2002 | Smith ................... F16L 59/029 428/36.5 | |
| 6,739,104 B2 * | 5/2004 | Tokonabe .............. F16L 59/065 52/406.1 | |
| 6,860,082 B1 * | 3/2005 | Yamamoto .............. E04B 1/803 52/406.1 | |
| 7,001,656 B2 * | 2/2006 | Maignan ................ E04B 1/803 428/116 | |
| 7,111,752 B2 * | 9/2006 | Bucher ................ B65D 90/022 220/592.2 | |
| 7,169,459 B2 * | 1/2007 | Lichodziejewski ....... B32B 3/20 428/188 | |
| 7,288,326 B2 * | 10/2007 | Elzey ..................... F16F 1/021 428/179 |
| 7,954,301 B2 * | 6/2011 | Mills ..................... F16L 59/065 52/788.1 |
| 8,383,225 B2 | 2/2013 | Rotter | |
| 8,857,931 B2 | 10/2014 | Jung et al. | |
| 8,881,398 B2 | 11/2014 | Hanley et al. | |
| 8,943,770 B2 | 2/2015 | Sanders | |
| 8,944,541 B2 | 2/2015 | Allard et al. | |
| 9,182,158 B2 | 11/2015 | Wu | |
| 9,328,951 B2 | 5/2016 | Shin | |
| 9,441,779 B1 | 9/2016 | Alshourbagy et al. | |
| 9,463,918 B2 | 10/2016 | Reid | |
| 9,752,818 B2 | 9/2017 | Naik | |
| 9,791,204 B2 | 10/2017 | Kim | |
| 9,945,600 B2 | 4/2018 | Kang | |
| 10,082,328 B2 | 9/2018 | Jung et al. | |
| 10,274,247 B2 | 4/2019 | Jeong et al. | |
| 2002/0041134 A1 | 4/2002 | Wolf et al. | |
| 2002/0100250 A1 | 8/2002 | Hirath et al. | |
| 2002/0170265 A1 | 11/2002 | Tokonabe et al. | |
| 2003/0080126 A1 | 5/2003 | Voute et al. | |
| 2003/0115838 A1 | 6/2003 | Rouanet et al. | |
| 2003/0207075 A1 | 11/2003 | Maignan et al. | |
| 2004/0051427 A1 | 3/2004 | Cittadini et al. | |
| 2004/0091688 A1 | 5/2004 | Gaku | |
| 2004/0226956 A1 * | 11/2004 | Brooks ................... F25D 23/06 220/592.02 |
| 2005/0175809 A1 | 8/2005 | Hirai et al. | |
| 2005/0235682 A1 | 10/2005 | Hirai et al. | |
| 2007/0089989 A1 * | 4/2007 | Hoagland ............ G01N 33/005 204/424 |
| 2007/0152551 A1 | 7/2007 | Kim et al. | |
| 2007/0204648 A1 | 9/2007 | Smale et al. | |
| 2007/0243358 A1 | 10/2007 | Gandini | |
| 2008/0110128 A1 | 5/2008 | Hirath | |
| 2008/0289898 A1 | 11/2008 | Rickards | |
| 2009/0031659 A1 | 2/2009 | Kalfon | |
| 2009/0113899 A1 | 5/2009 | Dain et al. | |
| 2010/0104923 A1 | 4/2010 | Takeguchi et al. | |
| 2010/0178439 A1 | 7/2010 | Bettger et al. | |
| 2010/0283359 A1 | 11/2010 | Hottmann | |
| 2011/0089802 A1 | 4/2011 | Cording | |
| 2011/0146333 A1 | 6/2011 | Koo et al. | |
| 2011/0241513 A1 | 10/2011 | Nomura | |
| 2011/0296797 A1 | 12/2011 | Stark et al. | |
| 2012/0103006 A1 | 5/2012 | Jung et al. | |
| 2012/0104923 A1 | 5/2012 | Jung et al. | |
| 2012/0118002 A1 * | 5/2012 | Kim ..................... F16L 59/065 428/69 |
| 2012/0125039 A1 | 5/2012 | Hwang | |
| 2012/0128920 A1 | 5/2012 | Yoon et al. | |
| 2012/0231204 A1 | 9/2012 | Jeon et al. | |
| 2012/0269996 A1 | 10/2012 | Jäger | |
| 2012/0326587 A1 | 12/2012 | Jeong et al. | |
| 2013/0008309 A1 | 1/2013 | Hashida | |
| 2013/0026900 A1 | 1/2013 | Oh et al. | |
| 2013/0099650 A1 | 4/2013 | Lee et al. | |
| 2013/0105494 A1 | 5/2013 | Jung | |
| 2013/0105495 A1 | 5/2013 | Jung | |
| 2013/0105496 A1 | 5/2013 | Jung | |
| 2013/0195544 A1 | 8/2013 | Sanders et al. | |
| 2013/0255304 A1 | 10/2013 | Cur et al. | |
| 2013/0257257 A1 | 10/2013 | Cur | |
| 2013/0293080 A1 | 11/2013 | Kim | |
| 2014/0103791 A1 | 4/2014 | Cheon | |
| 2014/0132142 A1 | 5/2014 | Kim et al. | |
| 2014/0216100 A1 | 8/2014 | Toshimitsu et al. | |
| 2014/0272208 A1 | 9/2014 | Song et al. | |
| 2014/0315011 A1 | 10/2014 | Lee et al. | |
| 2014/0346942 A1 | 11/2014 | Kim et al. | |
| 2015/0030800 A1 | 1/2015 | Jung et al. | |
| 2015/0068401 A1 | 3/2015 | Hashida | |
| 2015/0192356 A1 | 7/2015 | Kang et al. | |
| 2015/0360842 A1 | 12/2015 | Bessho et al. | |
| 2016/0108659 A1 | 4/2016 | Stark et al. | |
| 2016/0109172 A1 | 4/2016 | Kim et al. | |

(56) References Cited

U.S. PATENT DOCUMENTS

| | | | |
|---|---|---|---|
| 2016/0356542 | A1 | 12/2016 | Kim et al. |
| 2017/0325634 | A1 | 11/2017 | Cai et al. |
| 2018/0266620 | A1 | 9/2018 | Kawarazaki et al. |
| 2018/0299060 | A1 | 10/2018 | Song et al. |
| 2018/0313492 | A1 | 11/2018 | Kitano et al. |
| 2019/0101320 | A1 | 4/2019 | Dherde et al. |
| 2019/0128593 | A1 | 5/2019 | Deka et al. |

FOREIGN PATENT DOCUMENTS

| | | |
|---|---|---|
| CN | 1276052 | 12/2000 |
| CN | 1286386 | 3/2001 |
| CN | 15151857 | 7/2004 |
| CN | 1576678 | 2/2005 |
| CN | 2700790 | 5/2005 |
| CN | 1666071 | 9/2005 |
| CN | 2748848 | 12/2005 |
| CN | 1731053 | 2/2006 |
| CN | 1820173 | 8/2006 |
| CN | 1896657 | 1/2007 |
| CN | 101072968 | 11/2007 |
| CN | 101171472 | 4/2008 |
| CN | 101349493 | 1/2009 |
| CN | 201191121 | 2/2009 |
| CN | 201428906 | 3/2010 |
| CN | 201764779 | 3/2011 |
| CN | 102032736 | 4/2011 |
| CN | 201811526 | 4/2011 |
| CN | 102099646 | 6/2011 |
| CN | 102116402 | 7/2011 |
| CN | 102261470 | 11/2011 |
| CN | 102455103 | 5/2012 |
| CN | 102455104 | 5/2012 |
| CN | 102455105 | 5/2012 |
| CN | 102735013 | 10/2012 |
| CN | 102818421 | 12/2012 |
| CN | 102840729 | 12/2012 |
| CN | 102927740 | 2/2013 |
| CN | 103062981 | 4/2013 |
| CN | 103090615 | 5/2013 |
| CN | 103090616 | 5/2013 |
| CN | 103140640 | 6/2013 |
| CN | 103154648 | 6/2013 |
| CN | 103189696 | 7/2013 |
| CN | 103228851 | 7/2013 |
| CN | 203095854 | 7/2013 |
| CN | 103363764 | 10/2013 |
| CN | 103370587 | 10/2013 |
| CN | 103542660 | 1/2014 |
| CN | 103575038 | 2/2014 |
| CN | 103649658 | 3/2014 |
| CN | 103968196 | 8/2014 |
| CN | 104180595 | 12/2014 |
| CN | 104204646 | 12/2014 |
| CN | 104254749 | 12/2014 |
| CN | 104344653 | 2/2015 |
| CN | 104457117 A | 3/2015 |
| CN | 104482707 | 4/2015 |
| CN | 104567215 | 4/2015 |
| CN | 104634047 | 5/2015 |
| CN | 104696669 | 6/2015 |
| CN | 104729201 | 6/2015 |
| CN | 104746690 | 7/2015 |
| CN | 105546923 | 5/2016 |
| CN | 108354755 | 8/2018 |
| DE | 956 899 | 1/1957 |
| DE | 28 02 910 | 8/1978 |
| DE | 29 39 878 | 4/1981 |
| DE | 31 21 351 | 12/1982 |
| DE | 9204365 | 7/1992 |
| DE | 197 45 825 | 4/1999 |
| DE | 1 980 3908 | 8/1999 |
| DE | 299 12 917 | 11/1999 |
| DE | 199 07 182 | 8/2000 |
| DE | 10-2011-050473 | 11/2011 |
| DE | 10 2011 014 302 | 9/2012 |
| DE | 10 2011 079 209 | 1/2013 |
| DE | 10-2012-100490 | 7/2013 |
| DE | 10-2012-223539 | 6/2014 |
| EP | 0 071 090 | 2/1983 |
| EP | 0 658 716 | 6/1995 |
| EP | 0 658 733 | 6/1995 |
| EP | 0 892 120 | 1/1999 |
| EP | 1 477 752 | 11/2004 |
| EP | 1 484 563 | 12/2004 |
| EP | 1 614 954 | 1/2006 |
| EP | 2 333 179 | 6/2011 |
| EP | 2 447 639 | 5/2012 |
| EP | 2 806 239 | 11/2014 |
| EP | 2 824 405 | 1/2015 |
| EP | 2 829 827 | 1/2015 |
| EP | 2 936 013 | 10/2015 |
| EP | 2 952 839 | 12/2015 |
| EP | 2952838 | 12/2015 |
| EP | 2 789 951 | 10/2020 |
| GB | 890372 | 2/1962 |
| GB | 2 446 053 | 7/2008 |
| JP | H04-341694 | 11/1992 |
| JP | H05-10494 | 1/1993 |
| JP | H07-234067 | 9/1995 |
| JP | H09-145241 | 6/1997 |
| JP | 11-211334 | 8/1999 |
| JP | H11335114 | 12/1999 |
| JP | 2002-243091 A | 8/2002 |
| JP | 2002340280 | 11/2002 |
| JP | 2003-106760 | 4/2003 |
| JP | 2003-269688 | 9/2003 |
| JP | 2004-044980 | 2/2004 |
| JP | 2004-196411 | 7/2004 |
| JP | 2005-214372 A | 8/2005 |
| JP | 2007-218509 | 8/2007 |
| JP | 2008-045580 | 2/2008 |
| JP | 2008-249003 | 10/2008 |
| JP | 2009-078261 A | 4/2009 |
| JP | 2010-008011 | 1/2010 |
| JP | 2012-087993 | 5/2012 |
| JP | 2012-255607 | 12/2012 |
| JP | 2013-119966 A | 6/2013 |
| JP | 2013-195009 | 9/2013 |
| JP | 2014-037931 | 2/2014 |
| KR | 1019920703942 | 12/1992 |
| KR | 10-2001-0073363 | 8/2001 |
| KR | 10-0343719 | 7/2002 |
| KR | 10-0411841 | 12/2003 |
| KR | 10-2005-0065088 | 6/2005 |
| KR | 20070052156 | 5/2007 |
| KR | 10-2009-0111632 | 10/2009 |
| KR | 10-2010-0097410 | 9/2010 |
| KR | 10-2010-0099629 | 9/2010 |
| KR | 10-2010-0119937 | 11/2010 |
| KR | 10-2010-0136614 | 12/2010 |
| KR | 10-2011-0015322 | 2/2011 |
| KR | 10-2011-0015325 | 2/2011 |
| KR | 10-2011-0015327 | 2/2011 |
| KR | 10-1041086 | 6/2011 |
| KR | 10-2011-0100440 | 9/2011 |
| KR | 10-2012-0044558 A | 5/2012 |
| KR | 10-2012-0139648 | 12/2012 |
| KR | 10-1227516 | 1/2013 |
| KR | 10-2013-0048528 | 5/2013 |
| KR | 10-2013-0048530 A | 5/2013 |
| KR | 10-2013-0054213 | 5/2013 |
| KR | 10-2014-0129552 | 11/2014 |
| KR | 10-2015-0012712 | 2/2015 |
| KR | 10-1506413 | 3/2015 |
| NL | 1005962 | 11/1998 |
| RU | 129188 | 6/2013 |
| WO | WO 93/25843 | 12/1993 |
| WO | WO 2006/003199 | 1/2006 |
| WO | WO 2012/084874 | 6/2012 |
| WO | WO 2012/176880 | 12/2012 |
| WO | WO 2013/007568 | 1/2013 |
| WO | WO 2014/049969 | 4/2014 |
| WO | WO 2014/175639 | 10/2014 |

(56) References Cited

FOREIGN PATENT DOCUMENTS

| WO | WO 2016/208193 A1 | 12/2016 |
|---|---|---|
| WO | WO 2017/023095 | 2/2017 |
| WO | WO 2017/192121 | 11/2017 |
| WO | WO 2018/044274 | 3/2018 |

OTHER PUBLICATIONS

U.S. Appl. No. 17/411,659, filed Aug. 25, 2021.
U.S. Appl. No. 18/091,203, filed Dec. 29, 2022.
U.S. Appl. No. 17/170,005, filed Feb. 8, 2021.
U.S. Appl. No. 17/939,507, filed Sep. 7, 2022.
U.S. Appl. No. 17/749,679, filed May 20, 2022.
U.S. Appl. No. 17/582,596, filed Jan. 24, 2022.
U.S. Appl. No. 18/508,279, filed Nov. 14, 2023.
U.S. Appl. No. 18/095,658, filed Jan. 11, 2023.
U.S. Appl. No. 18/237,531, filed Aug. 24, 2023.
U.S. Appl. No. 17/980,088, filed Nov. 3, 2022.
U.S. Appl. No. 18/416,453, filed Jan. 18, 2024.
U.S. Appl. No. 18/091,040, filed Dec. 29, 2022.
Korean Office Action dated Jul. 31, 2023 issued in Application 10-2023-0020717.
U.S. Office Action dated Mar. 20, 2023 issued in co-pending related U.S. Appl. No. 17/030,806.
Machine translation of EP 2 952 839.
Korean Office Action dated Nov. 13, 2023 issued in Application No. 10-2023-0014241.
U.S. Appl. No. 18/640,367, filed Apr. 19, 2024.
Korean Office Action dated Apr. 4, 2024 issued in Application No. 10-2023-0036738.
U.S. Office Action dated Apr. 27, 2023 issued in U.S. Appl. No. 17/072,231.
U.S. Notice of Allowance dated Mar. 23, 2023 issued in U.S. Appl. No. 16/953,846.
International Search Report and Written Opinion dated Oct. 12, 2016 issued in Application No. PCT/KR2016/008465.
International Search Report and Written Opinion dated Oct. 12, 2016 issued in Application No. PCT/KR2016/008507.
International Search Report and Written Opinion dated Nov. 21, 2016 issued in Application No. PCT/KR2016/008466.
International Search Report and Written Opinion dated Nov. 21, 2016 issued in Application No. PCT/KR2016/008468.
International Search Report and Written Opinion dated Nov. 21, 2016 issued in Application No. PCT/KR2016/008469.
International Search Report and Written Opinion dated Nov. 21, 2016 issued in Application No. PCT/KR2016/008470.
International Search Report and Written Opinion dated Nov. 21, 2016 issued in Application No. PCT/KR2016/008501.
International Search Report and Written Opinion dated Nov. 21, 2016 issued in Application No. PCT/KR2016/008502.
International Search Report and Written Opinion dated Nov. 21, 2016 issued in Application No. PCT/KR2016/008505.
International Search Report and Written Opinion dated Nov. 21, 2016 issued in Application No. PCT/KR2016/008519.
International Search Report and Written Opinion dated Nov. 21, 2016 issued in Application No. PCT/KR2016/008523.
International Search Report and Written Opinion dated Dec. 7, 2016 issued in Application No. PCT/KR2016/008516.
International Search Report and Written Opinion dated Dec. 23, 2016 issued in Application No. PCT/KR2016/008512.
International Search Report and Written Opinion dated Dec. 23, 2016 issued in Application No. PCT/KR2016/008514.
Russian Office Action dated Sep. 25, 2018 issued in RU Application No. 2018107646.
European Search Report dated Dec. 21, 2018 issued in EP Application No. 16833330.0.
European Search Report dated Feb. 13, 2019 issued in EP Application No. 16833309.4.
European Search Report dated Feb. 13, 2019 issued in EP Application No. 16833311.0.
European Search Report dated Feb. 20, 2019 issued in EP Application No. 16833313.6.
European Search Report dated Feb. 22, 2019 issued in EP Application No. 16833312.8.
European Search Report dated Feb. 26, 2019 issued in EP Application No. 16833324.3.
European Search Report dated Feb. 26, 2019 issued in EP Application No. 16833336.7.
European Search Report dated Mar. 1, 2019 issued in EP Application No. 16833323.5.
European Search Report dated Mar. 1, 2019 issued in EP Application No. 16833338.3.
European Search Report dated Mar. 13, 2019 issued in EP Application No. 16833331.8.
European Search Report dated Mar. 15, 2019 issued in EP Application No. 16833326.8.
European Search Report dated Apr. 3, 2019 issued in EP Application No. 16833325.0.
U.S. Office Action dated Jun. 13, 2019 issued in related U.S. Appl. No. 15/749,139.
U.S. Office Action dated Jun. 13, 2019 issued in related U.S. Appl. No. 15/749,142.
U.S. Office Action dated Jun. 13, 2019 issued in related U.S. Appl. No. 15/749,136.
Chinese Office Action (with English translation) dated Jul. 15, 2019 issued in CN Application No. 201680045949.0.
Chinese Office Action (with English translation) dated Aug. 5, 2019 issued in CN Application No. 201680045869.5.
Chinese Office Action (with English translation) dated Aug. 5, 2019 issued in CN Application No. 201680045899.6.
Chinese Office Action (with English translation) dated Aug. 5, 2019 issued in CN Application No. 201680045908.1.
Chinese Office Action (with English translation) dated Aug. 5, 2019 issued in CN Application No. 201680045935.9.
Chinese Office Action (with English translation) dated Aug. 5, 2019 issued in CN Application No. 201680046042.6.
Chinese Office Action (with English translation) dated Aug. 5, 2019 issued in CN Application No. 201680046048.3.
Chinese Office Action (with English translation) dated Aug. 13, 2019 issued in CN Application No. 201680045950.3.
Chinese Office Action (with English translation) dated Sep. 19, 2019 issued in CN Application No. 201680045897. 7.
Chinese Office Action (with English translation) dated Sep. 19, 2019 issued in CN Application No. 201680045898.1.
Chinese Office Action (with English translation) dated Sep. 19, 2019 issued in CN Application No. 201680046047.9.
U.S. Office Action dated Sep. 20, 2019 issued in U.S. Appl. No. 15/749,149.
U.S. Office Action dated Oct. 4, 2019 issued in related U.S. Appl. No. 15/749,140.
U.S. Office Action dated Oct. 17, 2019 issued in U.S. Appl. No. 15/749,143.
U.S. Office Action dated Oct. 17, 2019 issued in U.S. Appl. No. 15/749,162.
U.S. Office Action dated Oct. 17, 2019 issued in parent U.S. Appl. No. 15/749,147.
U.S. Office Action dated Dec. 10, 2019 issued in U.S. Appl. No. 15/749,132.
U.S. Office Action dated Feb. 18, 2020 issued in co-pending related U.S. Appl. No. 15/749,146.
U.S. Office Action dated Mar. 20, 2020 issued in co-pending related U.S. Appl. No. 15/749,162.
U.S. Office Action dated Mar. 24, 2020 issued in co-pending related U.S. Appl. No. 15/749,154.
U.S. Office Action dated Mar. 27, 2020 issued in co-pending related U.S. Appl. No. 15/749,149.
U.S. Office Action dated Apr. 15, 2020 issued in co-pending related U.S. Appl. No. 15/749,136.
U.S. Notice of Allowance dated Apr. 15, 2020 issued in co-pending related U.S. Appl. No. 15/749,140.
U.S. Office Action dated May 25, 2020 issued in co-pending related U.S. Appl. No. 15/749,156.

(56) References Cited

OTHER PUBLICATIONS

Korean Office Action dated Jun. 5, 2020 issued in Application 10-2017-0093784.
Extended European Search Report dated Jul. 10, 2020 issued in Application 20168389.3.
European Office Action dated Jan. 11, 2021 issued in Application 16 833 313.6.
United States Office Action dated Feb. 5, 2021 issued in related co-pending U.S. Appl. No. 15/749,156.
U.S. Office Action dated Mar. 31, 2021 issued in co-pending U.S. Appl. No. 15/749,132.
Chinese Office Action dated Apr. 6, 2021 issued in CN Application No. 202010248772.2.
Chinese Office Action dated Apr. 6, 2021 issued in CN Application No. 202010248789.8.
Chinese Office Action dated Apr. 6, 2021 issued in CN Application No. 202010248791.5.
Chinese Office Action dated Apr. 8, 2021 issued in CN Application No. 202010248891.8.
Chinese Office Action dated Jun. 2, 2021 issued in CN Application No. 202010634146.7.
Chinese Office Action dated Jun. 23, 2021 issued in CN Application No. 202010669915.7.
Chinese Office Action dated Jun. 24, 2021 issued in CN Application No. 202010669926.5.
United States Office Action dated Jun. 28, 2021 issued in co-pending related U.S. Appl. No. 15/749,156.
Chinese Office Action and Search Report dated Jul. 20, 2021 issued in Application 20101067100.X.
Korean Office Action dated Aug. 1, 2021 issued in KR Application No. 10-2021-0085731.
Chinese Office Action dated Aug. 2, 2021 issued in CN Application No. 202010972409.5.
Chinese Office Action dated Aug. 3, 2021 issued in CN Application No. 202010972419.9.
Chinese Office Action dated Aug. 4, 2021 issued in CN Application No. 202010972442.8.
United States Office Action dated Oct. 5, 2021 issued in co-pending related U.S. Appl. No. 16/942,262.
European Search Report dated Oct. 11, 2021 issued in EP Application No. 21185349.4.
European Search Report dated Oct. 11, 2021 issued in EP Application No. 21185362.7.
United States Office Action dated Oct. 22, 2021 issued in co-pending related U.S. Appl. No. 17/021,582.
United States Office Action dated Oct. 26, 2021 issued in co-pending related U.S. Appl. No. 16/942,213.
Chinese Office Action dated Dec. 3, 2021 issued in CN Application No. 202110032077.7.
European Search Report dated Feb. 8, 2022 issued in EP Application No. 21203498.7.
Chinese Office Action dated Feb. 15, 2022 issued in CN Application No. 202010671000.X.
Chinese Office Action dated Feb. 18, 2022 issued in CN Application No. 202010975466.9.
United States Office Action dated Mar. 2, 2022 issued in co-pending related U.S. Appl. No. 17/170,005.
United States Office Action dated Mar. 31, 2022 issued in co-pending related U.S. Appl. No. 16/929,523.
Chinese Office Action dated May 18, 2022 issued in CN Application No. 202110718315.X.
Chinese Notice of Allowance dated Jun. 1, 2022 issued in CN Application No. 202110032072.4.
Korean Notice of Allowance dated Jun. 1, 2022 issued in KR Application No. 10-2021-0085731.
United States Office Action dated Jun. 10, 2022 issued in co-pending related U.S. Appl. No. 16/942,213.
United States Office Action dated Jul. 7, 2022 issued in co-pending related U.S. Appl. No. 16/710,720.
United States Office Action dated Jul. 13, 2022 issued in co-pending related U.S. Appl. No. 17/134,911.
United States Office Action dated Jul. 26, 2022 issued in co-pending related U.S. Appl. No. 17/030,806.
Korean Office Action dated Aug. 8, 2022 issued in KR Application No. 10-2015-0109622.
United States Office Action dated Oct. 6, 2022 issued in co-pending related U.S. Appl. No. 17/072,231.
Korean Notice of Allowance dated Nov. 2, 2022 issued in Application 10-2015-0109720.
European Search Report dated Nov. 3, 2022 issued in EP Application No. 22151005.0.
European Office Action dated Nov. 21, 2022 issued in EP Application No. 20168389.3.
United States Office Action dated Nov. 25, 2022 issued in co-pending related U.S. Appl. No. 17/411,659.
United States Office Action dated Dec. 22, 2022 issued in co-pending related U.S. Appl. No. 16/953,846.
U.S. Appl. No. 16/942,213, filed Jul. 29, 2020.
U.S. Appl. No. 17/030,806, filed Sep. 24, 2020.
U.S. Appl. No. 16/710,720, filed Dec. 11, 2019.
U.S. Appl. No. 17/072,231, filed Oct. 16, 2020.
U.S. Appl. No. 16/953,846, filed Nov. 20, 2020.
U.S. Appl. No. 17/155,430, filed Jan. 22, 2021.
U.S. Office Action dated Jan. 24, 2024 issued in U.S. Appl. No. 17/582,596.
Chinese Office Action dated Aug. 30, 2023 issued in Application No. 202110718284.8.
U.S. Office Action dated Nov. 22, 2023 issued in U.S. Appl. No. 17/939,507.
U.S. Appl. No. 18/095,658, filed May 20, 2022.
United States Office Action dated Jan. 18, 2023 issued in co-pending related U.S. Appl. No. 16/942,213.
U.S. Notice of Allowance dated Oct. 23, 2023, issued in U.S. Appl. No. 17/072,231.
Korean Office Action dated Nov. 1, 2023 issued in Application No. 10-2023-0015566.
U.S. Non-Final Office Action dated Feb. 27, 2024 issued in U.S. Appl. No. 17/980,088.
U.S. Office Action dated Jul. 3, 2024 issued in U.S. Appl. No. 17/582,596.
European Search Report dated Jul. 12, 2024 issued in Application No. 20193768.7.
Chinese Office Action dated Jun. 14, 2024 issued in Application No. 202010974212.5.
U.S. Office Action dated Nov. 29, 2024 issued in U.S. Appl. No. 17/411,659.
Korean Office Action dated Oct. 22, 2024 issued in Application No. 10-2024-0110720.

* cited by examiner (a)

(b)

(c)

VACUUM ADIABATIC BODY AND REFRIGERATOR

CROSS-REFERENCE TO RELATED APPLICATIONS

This application is a Continuation Application of U.S. patent application Ser. No. 16/929,523 filed Jul. 15, 2020, which is a Continuation Application of U.S. patent application Ser. No. 15/749,140 filed Jan. 31, 2018 (now U.S. Pat. No. 10,753,671), which is a U.S. National Stage Application under 35 U.S.C. § 371 of PCT Application No. PCT/KR2016/008507, filed Aug. 2, 2016, which claims priority to Korean Patent Application No. 10-2015-0109625, filed Aug. 3, 2015, whose entire disclosures are hereby incorporated by reference.

FIELD

The present disclosure relates to a vacuum adiabatic body and a refrigerator.

BACKGROUND

A vacuum adiabatic body is a product for suppressing heat transfer by vacuumizing the interior of a body thereof. The vacuum adiabatic body can reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 cm or more is generally provided. However, the internal volume of the refrigerator is therefore reduced. In order to increase the internal volume of a refrigerator, there is an attempt to apply a vacuum adiabatic body to the refrigerator.

First, Korean Patent No. 10-0343719 (Reference Document 1) of the present applicant has been disclosed. According to Reference Document 1, there is disclosed a method in which a vacuum adiabatic panel is prepared and then built in walls of a refrigerator, and the exterior of the vacuum adiabatic panel is finished with a separate molding such as Styrofoam (polystyrene). According to the method, additional foaming is not required, and the adiabatic performance of the refrigerator is improved. However, manufacturing cost is increased, and a manufacturing method is complicated.

As another example, a technique of providing walls using a vacuum adiabatic material and additionally providing adiabatic walls using a foam filling material has been disclosed in Korean Patent Publication No. 10-2015-0012712 (Reference Document 2). According to Reference Document 2, manufacturing cost is increased, and a manufacturing method is complicated.

As another example, there is an attempt to manufacture all walls of a refrigerator using a vacuum adiabatic body that is a single product. For example, a technique of providing an adiabatic structure of a refrigerator to be in a vacuum state has been disclosed in U.S. Patent Laid-Open Publication No. US20040226956A1 (Reference Document 3).

However, it is difficult to obtain an adiabatic effect of a practical level by providing the walls of the refrigerator to be in a sufficient vacuum state. Specifically, it is difficult to prevent heat transfer at a contact portion between external and internal cases having different temperatures. Further, it is difficult to maintain a stable vacuum state. Furthermore, it is difficult to prevent deformation of the cases due to a sound pressure in the vacuum state. Due to these problems, the technique of Reference Document 3 is limited to cryogenic refrigerating apparatuses, and is not applied to refrigerating apparatuses used in general households.

Embodiments provide a vacuum adiabatic body and a refrigerator, which can obtain a sufficient adiabatic effect in a vacuum state and be applied commercially. Embodiments also provide a design reference by considering the strength and deformation of a side frame provided in the vacuum adiabatic body.

In one embodiment, a vacuum adiabatic body includes: a first plate member defining at least one portion of a wall for a first space; a second plate member defining at least one portion of a wall for a second space having a different temperature from the first space; a sealing part sealing the first plate member and the second plate member to provide a third space that has a temperature between the temperature of the first space and the temperature of the second space and is in a vacuum state; a supporting unit maintaining the third space; a heat resistance unit for decreasing a heat transfer amount between the first plate member and the second plate member; and an exhaust port through which a gas in the third space is exhausted, wherein the heat resistance unit includes a conductive resistance sheet having one end connected to the first plate member, the conductive resistance sheet resisting heat conduction flowing along a wall for the third space, the heat resistance unit further includes a side frame connected to the conductive resistance sheet, the side frame defining at least one portion of the wall for the third space, the side frame includes a first mounting surface connected to the conductive resistance sheet and a second mounting surface connected to the second plate member, and the second mounting surface is supported by the supporting unit.

In another embodiment, a vacuum adiabatic body includes: a first plate member defining at least one portion of a wall for a first space; a second plate member defining at least one portion of a wall for a second space having a different temperature from the first space; a sealing part sealing the first plate member and the second plate member to provide a third space that has a temperature between the temperature of the first space and the temperature of the second space and is in a vacuum state; a supporting unit maintaining the third space; a heat resistance unit for decreasing a heat transfer amount between the first plate member and the second plate member; and an exhaust port through which a gas in the third space is exhausted; wherein the heat resistance unit includes a conductive resistance sheet having one end connected to the first plate member, the conductive resistance sheet resisting heat conduction flowing along a wall for the third space, the heat resistance unit further includes a side frame connected to the conductive resistance sheet, the side frame defining at least one portion of the wall for the third space, and the side frame includes a first mounting surface connected to the conductive resistance sheet and a second mounting surface connected to the second plate member.

In still another embodiment, a refrigerator includes: a main body provided with an internal space in which storage goods are stored; and a door provided to open/close the main body from an external space, wherein, in order to supply a refrigerant into the internal space, the refrigerator includes: a compressor for compressing the refrigerant; a condenser for condensing the compressed refrigerant; an expander for expanding the condensed refrigerant; and an evaporator for evaporating the expanded refrigerant to take heat, wherein at least one of the main body and the door includes a vacuum adiabatic body, wherein the vacuum adiabatic body includes: a first plate member defining at least one portion of a wall for the internal space; a second plate member defining at least one portion of a wall for the external space; a sealing part sealing the first plate member and the second plate member to provide a vacuum space part that has a temperature between a temperature of the internal space and a temperature of the external space and is in a vacuum state; a supporting unit maintaining the vacuum space part; a heat resistance unit for decreasing a heat transfer amount between the first plate member and the second plate member; and an exhaust port through which a gas in the vacuum space part is exhausted, wherein the vacuum adiabatic body provided in the door includes: a conductive resistance sheet having one end connected to the first plate member, the conductive resistance sheet resisting heat conduction flowing along a wall for the vacuum space part; and a side frame connected to the conductive resistance sheet, the side frame defining at least one portion of the wall for the vacuum space part, wherein the side frame includes a first mounting surface connected to the conductive resistance sheet, a second mounting surface connected to the second plate member, and a connection part connecting the first mounting surface and the second mounting surface to each other.

According to the present disclosure, it is possible to provide a vacuum adiabatic body having a vacuum adiabatic effect and a refrigerator including the same.

BRIEF DESCRIPTION OF DRAWINGS

The embodiments will be described in detail with reference to the following drawings in which like reference numerals refer to like elements wherein.

DETAILED DESCRIPTION

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the disclosure may be practiced. These embodiments are described in sufficient detail to enable those skilled in the art to practice the disclosure, and it is understood that other embodiments may be utilized and that logical structural, mechanical, electrical, and chemical changes may be made without departing from the spirit or scope of the disclosure. To avoid detail not necessary to enable those skilled in the art to practice the disclosure, the description may omit certain information known to those skilled in the art. The following detailed description is, therefore, not to be taken in a limiting sense.

In the following description, the term 'vacuum pressure' means a certain pressure state lower than atmospheric pressure. In addition, the expression that a vacuum degree of A is higher than that of B means that a vacuum pressure of A is lower than that of B.

Figure 1:
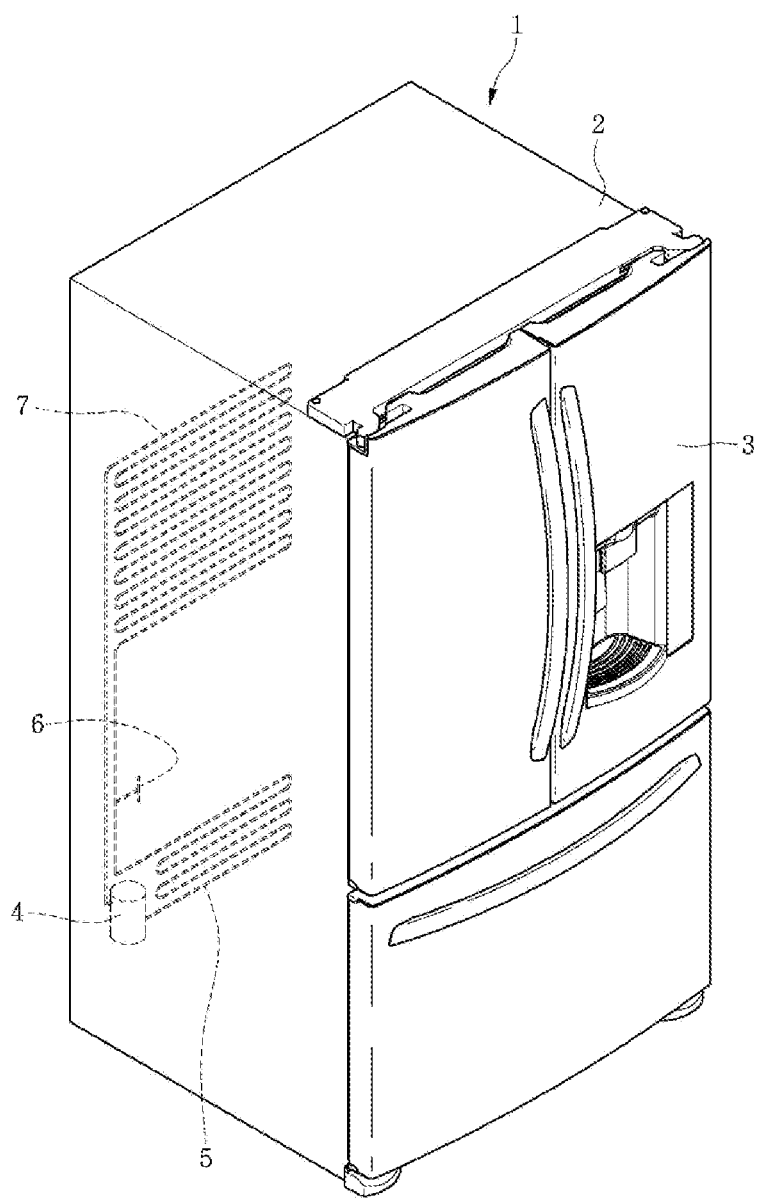
FIG. 1 is a perspective view of a refrigerator according to an embodiment.
Figure 2:
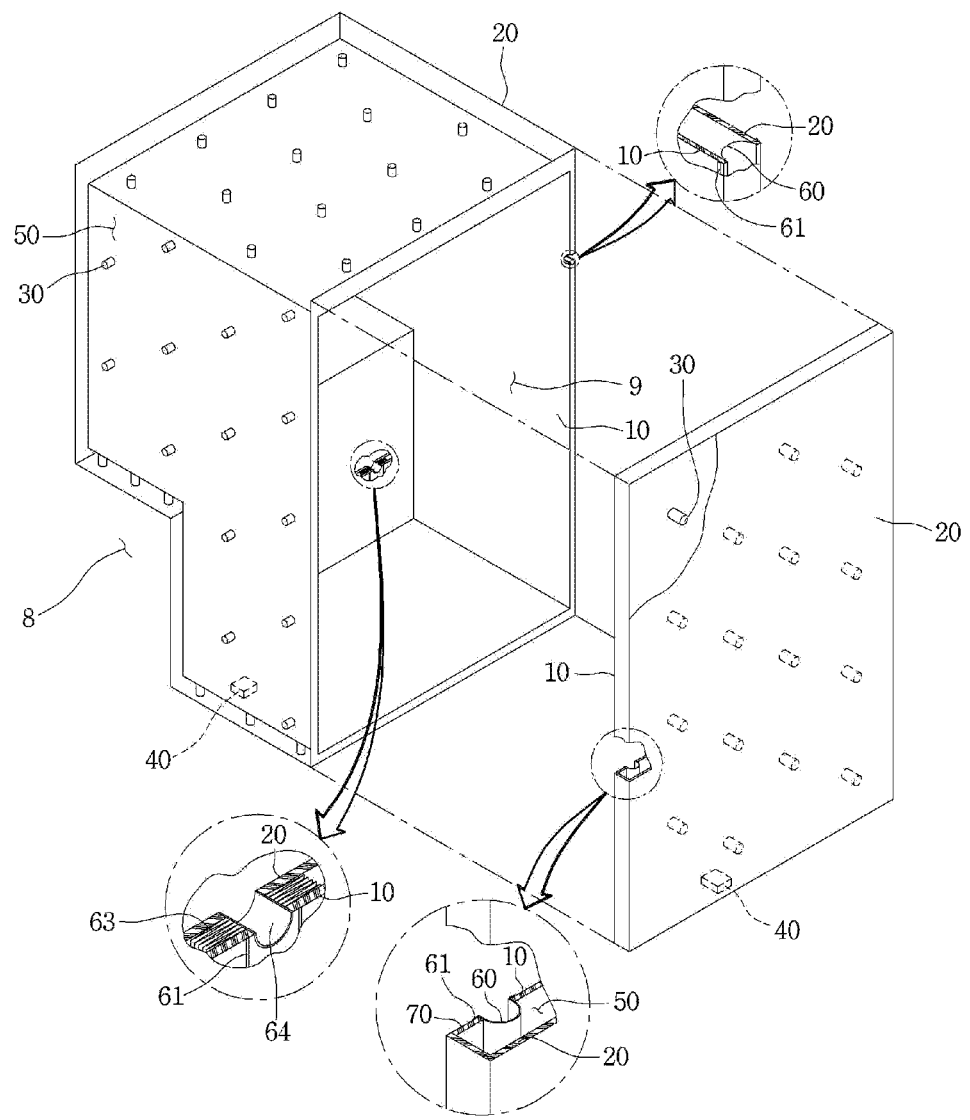
FIG. 2 is a view schematically showing a vacuum adiabatic body used in a main body and a door of the refrigerator.

FIG. 1 is a perspective view of a refrigerator according to an embodiment. FIG. 2 is a view schematically showing a vacuum adiabatic body used in the main body and the door of the refrigerator. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets are provided are schematically illustrated for convenience of understanding.

Referring to FIG. 1 and FIG. 2, the refrigerator 1 includes a main body 2 provided with a cavity 9 capable of storing storage goods and a door 3 provided to open/close the main body 2. The door 3 may be rotatably or movably disposed to open/close the cavity 9. The cavity 9 may provide at least one of a refrigerating chamber and a freezing chamber.

Parts constituting a freezing cycle in which cold air is supplied into the cavity 9 may be included. Specifically, the parts include a compressor 4 for compressing a refrigerant, a condenser 5 for condensing the compressed refrigerant, an expander 6 for expanding the condensed refrigerant, and an evaporator 7 for evaporating the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting the blowing amount and blowing direction by the fan, adjusting the amount of a circulated refrigerant, or adjusting the compression rate of the compressor, so that it is possible to control a refrigerating space or a freezing space.

The vacuum adiabatic body includes a first plate member (or first plate) 10 for providing a wall of a low-temperature space, a second plate member (or second plate) 20 for providing a wall of a high-temperature space, a vacuum space part (or vacuum space) 50 defined as a gap part between the first and second plate members 10 and 20. Also, the vacuum adiabatic body includes the conductive resistance sheets 60 and 62 for preventing heat conduction between the first and second plate members 10 and 20.

A sealing part (or seal) 61 for sealing the first and second plate members 10 and 20 is provided such that the vacuum space part 50 is in a sealing state. When the vacuum adiabatic body is applied to a refrigerating or heating cabinet, the first plate member 10 may be referred to as an inner case, and the second plate member 20 may be referred to as an outer case. A machine chamber 8 in which parts providing a freezing cycle are accommodated is placed at a lower rear side of the main body-side vacuum adiabatic body, and an exhaust port 40 for forming a vacuum state by exhausting air in the vacuum space part 50 is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. Here, the wall for each space may serve as not only a wall directly contacting the space but also a wall not contacting the space. For example, the vacuum adiabatic body of the embodiment may also be applied to a product further having a separate wall contacting each space.

Factors of heat transfer, which cause loss of the adiabatic effect of the vacuum adiabatic body, are heat conduction between the first and second plate members 10 and 20, heat radiation between the first and second plate members 10 and 20, and gas conduction of the vacuum space part 50.

Hereinafter, a heat resistance unit provided to reduce adiabatic loss related to the factors of the heat transfer will be provided. Meanwhile, the vacuum adiabatic body and the refrigerator of the embodiment do not exclude that another adiabatic means is further provided to at least one side of the vacuum adiabatic body. Therefore, an adiabatic means using foaming or the like may be further provided to another side of the vacuum adiabatic body.

Figure 3:
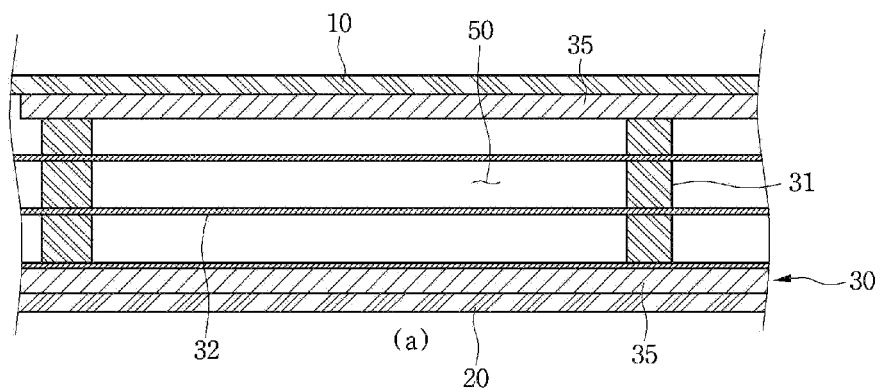
FIG. 3 is a view showing various embodiments of an internal configuration of a vacuum space part.
Figure 3:
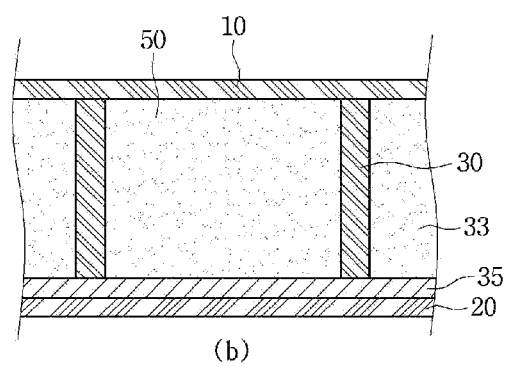
Figure 3:
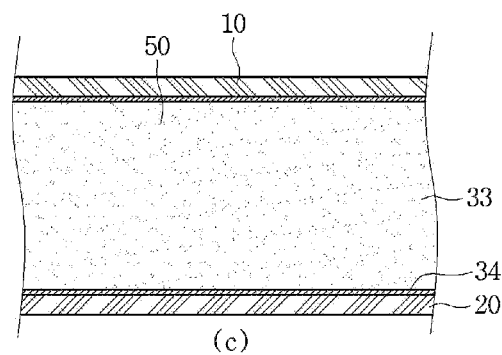

FIG. 3 is a view showing various embodiments of an internal configuration of the vacuum space part. First, referring to FIG. 3a, the vacuum space part 50 is provided in a third space having a different pressure from the first and second spaces, preferably, a vacuum state, thereby reducing adiabatic loss. The third space may be provided at a temperature between the temperature of the first space and the temperature of the second space. Since the third space is provided as a space in the vacuum state, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, adiabatic loss may be caused due to an increase in amount of heat radiation, caused by the contraction of the vacuum space part 50, and an increase in amount of heat conduction, caused by contact between the plate members 10 and 20.

A supporting unit (or support) 30 may be provided to reduce the deformation of the vacuum space part 50. The supporting unit 30 includes bars 31. The bars 31 may extend in a direction substantially vertical to the first and second plate members 10 and 20 so as to support a distance between the first and second plate members 10 and 20. A support plate 35 may be additionally provided to at least one end of the bar 31. The support plate 35 connects at least two bars 31 to each other, and may extend in a direction horizontal to the first and second plate members 10 and 20.

The support plate 35 may be provided in a plate shape, or may be provided in a lattice shape such that its area contacting the first or second plate member 10 or 20 is decreased, thereby reducing heat transfer. The bars 31 and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20.

In addition, based on the extending direction of the bars 31, a total sectional area of the support plate 35 is provided to be greater than that of the bars 31, so that heat transferred through the bars 31 can be diffused through the support plate 35. A material of the supporting unit 30 may include a resin selected from the group consisting of PC, glass fiber PC, low outgassing PC, PPS, and LCP so as to obtain high compressive strength, low outgassing and water absorptance, low thermal conductivity, high compressive strength at high temperature, and excellent machinability.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred.

In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20.

A product having a low emissivity may be preferably used as the material of the radiation resistance sheet 32. In an embodiment, an aluminum foil having an emissivity of 0.02 may be used as the radiation resistance sheet 32. Since the transfer of radiation heat cannot be sufficiently blocked using one radiation resistance sheet, at least two radiation resistance sheets 32 may be provided at a certain distance so as not to contact each other. In addition, at least one radiation resistance sheet may be provided in a state in which it contacts the inner surface of the first or second plate member 10 or 20.

Referring to FIG. 3b, the distance between the plate members is maintained by the supporting unit 30, and a porous material 33 may be filled in the vacuum space part 50. The porous material 33 may have a higher emissivity than the stainless material of the first and second plate members 10 and 20. However, since the porous material 33 is filled in the vacuum space part 50, the porous material 33 has a high efficiency for blocking the transfer of radiation heat. In this embodiment, the vacuum adiabatic body can be manufactured without using the radiation resistance sheet 32.

Referring to FIG. 3c, the supporting unit 30 maintaining the vacuum space part 50 is not provided. Instead of the supporting unit 30, the porous material 33 is provided in a state in which it is surrounded by a film 34. In this case, the porous material 33 may be provided in a state in which it is compressed so as to maintain the gap of the vacuum space part 50. The film 34 is made of, for example, a PE material, and may be provided in a state in which holes are formed therein.

In this embodiment, the vacuum adiabatic body can be manufactured without using the supporting unit 30. In other words, the porous material 33 can serve together as the radiation resistance sheet 32 and the supporting unit 30.

Figure 4:
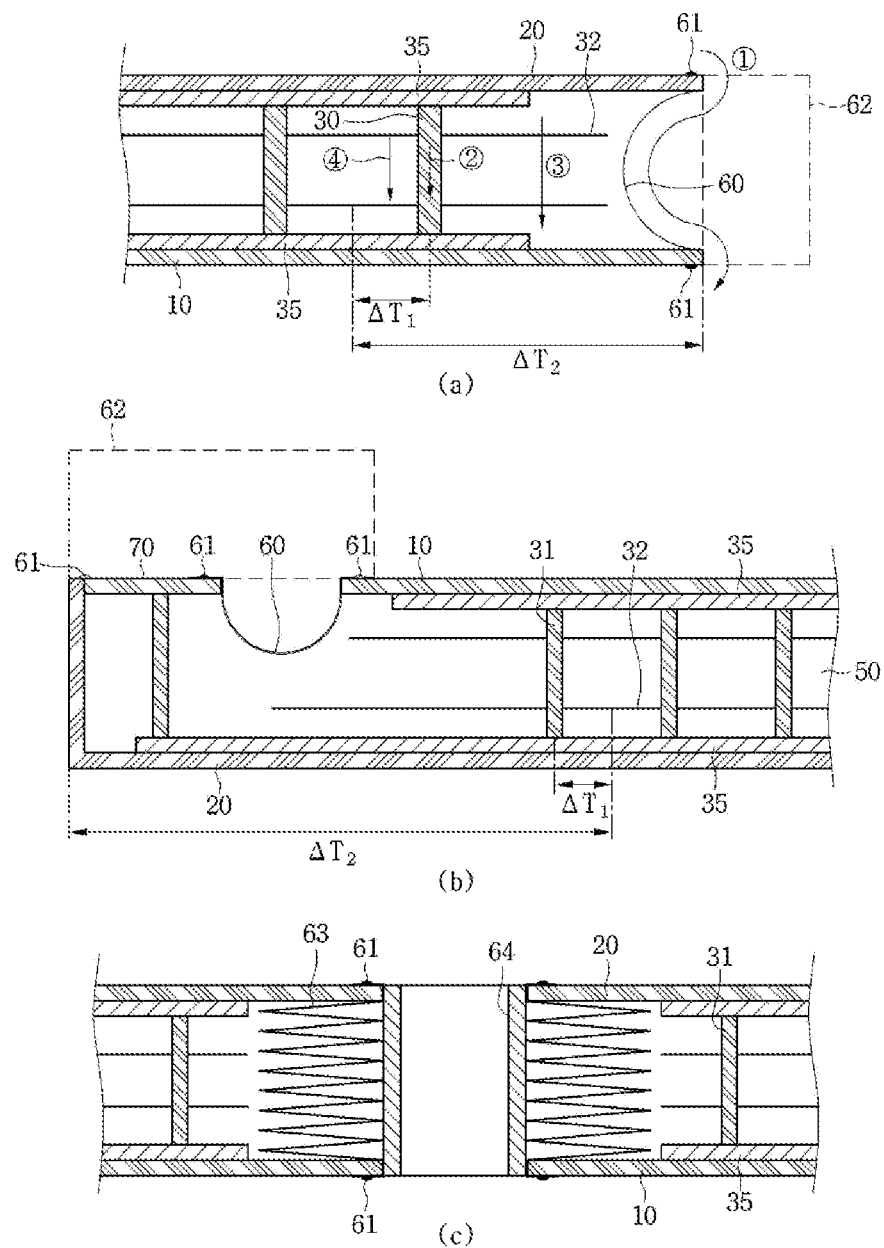
FIG. 4 is a view showing various embodiments of conductive resistance sheets and peripheral parts thereof.

FIG. 4 is a view showing various embodiments of the conductive resistance sheets and peripheral parts thereof. Structures of the conductive resistance sheets are briefly illustrated in FIG. 2, but will be understood in detail with reference to FIG. 4.

First, a conductive resistance sheet proposed in FIG. 4a may be preferably applied to the main body-side vacuum adiabatic body. Specifically, the first and second plate members 10 and 20 are to be sealed so as to vacuumize the interior of the vacuum adiabatic body. In this case, since the two plate members have different temperatures from each other, heat transfer may occur between the two plate members. A conductive resistance sheet 60 is provided to prevent heat conduction between two different kinds of plate members.

The conductive resistance sheet 60 may be provided with sealing parts 61 at which both ends of the conductive resistance sheet 60 are sealed to define at least one portion of the wall for the third space and maintain the vacuum state. The conductive resistance sheet 60 may be provided as a thin foil in units of micrometers so as to reduce the amount of heat conducted along the wall for the third space. The sealing parts 61 may be provided as welding parts. That is, the conductive resistance sheet 60 and the plate members 10 and 20 may be fused to each other.

In order to cause a fusing action between the conductive resistance sheet 60 and the plate members 10 and 20, the conductive resistance sheet 60 and the plate members 10 and 20 may be made of the same material, and a stainless material may be used as the material. The sealing parts 61 are not limited to the welding parts, and may be provided through a process such as cocking. The conductive resistance sheet 60 may be provided in a curved shape. Thus, a heat conduction distance of the conductive resistance sheet 60 is provided longer than the linear distance of each plate member, so that the amount of heat conduction can be further reduced.

A change in temperature occurs along the conductive resistance sheet 60. Therefore, in order to block heat transfer to the exterior of the conductive resistance sheet 60, a shielding part (or shield) 62 may be provided at the exterior of the conductive resistance sheet 60 such that an adiabatic action occurs. In other words, in the refrigerator, the second plate member 20 has a high temperature and the first plate member 10 has a low temperature. In addition, heat conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur.

In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof, which is not preferable.

The shielding part 62 may be provided as a porous material contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body and the door are opened, the shielding part 62 may be preferably provided as a porous material or a separate adiabatic structure.

A conductive resistance sheet proposed in FIG. 4b may be preferably applied to the door-side vacuum adiabatic body. In FIG. 4b, portions different from those of FIG. 4a are described in detail, and the same description is applied to portions identical to those of FIG. 4a. A side frame 70 is further provided at an outside of the conductive resistance sheet 60. A part for sealing between the door and the main body, an exhaust port necessary for an exhaust process, a getter port for vacuum maintenance, and the like may be placed on the side frame 70. This is because the mounting of parts is convenient in the main body-side vacuum adiabatic body, but the mounting positions of parts are limited in the door-side vacuum adiabatic body.

In the door-side vacuum adiabatic body, it is difficult to place the conductive resistance sheet 60 at a front end portion of the vacuum space part, i.e., a corner side portion of the vacuum space part. This is because, unlike the main body, a corner edge portion of the door is exposed to the exterior. More specifically, if the conductive resistance sheet 60 is placed at the front end portion of the vacuum space part, the corner edge portion of the door is exposed to the exterior, and hence there is a disadvantage in that a separate adiabatic part should be configured so as to improve the adiabatic performance of the conductive resistance sheet 60.

A conductive resistance sheet proposed in FIG. 4c may be preferably installed in the pipeline passing through the vacuum space part. In FIG. 4c, portions different from those of FIGS. 4a and 4b are described in detail, and the same description is applied to portions identical to those of FIGS. 4a and 4b. A conductive resistance sheet having the same shape as that of FIG. 4a, preferably, a wrinkled conductive resistance sheet 63 may be provided at a peripheral portion of the pipeline 64. Accordingly, a heat transfer path can be lengthened, and deformation caused by a pressure difference can be prevented. In addition, a separate shielding part may be provided to improve the adiabatic performance of the conductive resistance sheet.

A heat transfer path between the first and second plate members 10 and 20 will be described with reference back to FIG. 4a. Heat passing through the vacuum adiabatic body may be divided into surface conduction heat ① conducted along a surface of the vacuum adiabatic body, more specifically, the conductive resistance sheet 60, supporter conduction heat ② conducted along the supporting unit 30 provided inside the vacuum adiabatic body, gas conduction heat (or convection) ③ conducted through an internal gas in the vacuum space part, and radiation transfer heat ④ transferred through the vacuum space part.

The transfer heat may be changed depending on various design dimensions. For example, the supporting unit may be changed such that the first and second plate members 10 and 20 can endure a vacuum pressure without being deformed, the vacuum pressure may be changed, the distance between the plate members may be changed, and the length of the conductive resistance sheet may be changed. The transfer heat may be changed depending on a difference in temperature between the spaces (the first and second spaces) respectively provided by the plate members. In the embodiment, a preferred configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ can become smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is largest. For example, the heat transfer amount by the solid conduction heat may reach 75% of the total heat transfer amount. A heat transfer amount by the radiation transfer heat ④ is smaller than the heat transfer amount by the solid conduction heat but larger than the heat transfer amount of the gas conduction heat ③. For example, the heat transfer amount by the radiation transfer heat ④ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Math Figure 1.

$$eK_{solidconductionheat} > eK_{radiationtransferheat} > eK_{gasconductionheat}$$ [Math Figure 1]

Here, the effective heat transfer coefficient (eK) is a value that can be measured using a shape and temperature differences of a target product. The effective heat transfer coefficient (eK) is a value that can be obtained by measuring a total heat transfer amount and a temperature of at least one portion at which heat is transferred. For example, a calorific value (W) is measured using a heating source that can be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by $k=QL/A\Delta T$. Here, Q denotes a calorific value (W) and may be obtained using a calorific value of a heater. A denotes a sectional area (m2) of the vacuum adiabatic body, L denotes a thickness (m) of the vacuum adiabatic body, and $\Delta T$ denotes a temperature difference.

For the surface conduction heat, a conductive calorific value may be obtained through a temperature difference ($\Delta T$) between an entrance and an exit of the conductive resistance sheet 60 or 63, a sectional area (A) of the conductive resistance sheet, a length (L) of the conductive resistance sheet, and a thermal conductivity (k) of the conductive resistance sheet (the thermal conductivity of the conductive resistance sheet is a material property of a material and can be obtained in advance). For the supporter conduction heat, a conductive calorific value may be obtained through a temperature difference ($\Delta T$) between an entrance and an exit of the supporting unit 30, a sectional area (A) of the supporting unit, a length (L) of the supporting unit, and a thermal conductivity (k) of the supporting unit. Here, the thermal conductivity of the supporting unit is a material property of a material and can be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous material is provided inside the vacuum space part 50, porous material conduction heat ⑤ may be a sum of the supporter conduction heat ② and the radiation transfer heat ④. The porous material conduction heat ⑤ may be changed depending on various variables including a kind, an amount, and the like of the porous material.

According to an embodiment, a temperature difference $\Delta T1$ between a geometric center formed by adjacent bars 31 and a point at which each of the bars 31 is located may be preferably provided to be less than 0.5° C. Also, a temperature difference $\Delta T2$ between the geometric center formed by the adjacent bars 31 and an edge portion of the vacuum adiabatic body may be preferably provided to be less than 0.5° C. In the second plate member 20, a temperature difference between an average temperature of the second plate and a temperature at a point at which a heat transfer path passing through the conductive resistance sheet 60 or 63 meets the second plate may be largest.

For example, when the second space is a region hotter than the first space, the temperature at the point at which the heat transfer path passing through the conductive resistance sheet meets the second plate member becomes lowest. Similarly, when the second space is a region colder than the first space, the temperature at the point at which the heat transfer path passing through the conductive resistance sheet meets the second plate member becomes highest.

This means that the amount of heat transferred through other points except the surface conduction heat passing through the conductive resistance sheet should be controlled, and the entire heat transfer amount satisfying the vacuum adiabatic body can be achieved only when the surface conduction heat occupies the largest heat transfer amount. To this end, a temperature variation of the conductive resistance sheet may be controlled to be larger than that of the plate member.

Physical characteristics of the parts constituting the vacuum adiabatic body will be described. In the vacuum adiabatic body, a force by vacuum pressure is applied to all of the parts. Therefore, a material having a strength (N/m2) of a certain level may be preferably used.

Under such circumferences, the plate members 10 and 20 and the side frame 70 may be preferably made of a material having a sufficient strength with which they are not damaged by even vacuum pressure. For example, when the number of bars 31 is decreased so as to limit the support conduction heat, deformation of the plate member occurs due to the vacuum pressure, which may be a bad influence on the external appearance of refrigerator. The radiation resistance sheet 32 may be preferably made of a material that has a low emissivity and can be easily subjected to thin film processing. Also, the radiation resistance sheet 32 is to ensure a strength high enough not to be deformed by an external impact. The supporting unit 30 is provided with a strength high enough to support the force by the vacuum pressure and endure an external impact, and is to have machinability. The conductive resistance sheet 60 may be preferably made of a material that has a thin plate shape and can endure the vacuum pressure.

In an embodiment, the plate member, the side frame, and the conductive resistance sheet may be made of stainless materials having the same strength. The radiation resistance sheet may be made of aluminum having a weaker strength that the stainless materials. The supporting unit may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having a predetermined strength, but the stiffness of the material is preferably low so as to increase heat resistance and minimize radiation heat as the conductive resistance sheet is uniformly spread without any roughness when the vacuum pressure is applied. The radiation resistance sheet 32 requires a stiffness of a certain level so as not to contact another part due to deformation. Particularly, an edge portion of the radiation resistance sheet may generate conduction heat due to drooping caused by the self-load of the radiation resistance sheet. Therefore, a stiffness of a certain level is required. The supporting unit 30 requires a stiffness high enough to endure a compressive stress from the plate member and an external impact.

In an embodiment, the plate member and the side frame may preferably have the highest stiffness so as to prevent deformation caused by the vacuum pressure. The supporting unit, particularly, the bar may preferably have the second highest stiffness. The radiation resistance sheet may preferably have a stiffness that is lower than that of the supporting unit but higher than that of the conductive resistance sheet.

The conductive resistance sheet may be preferably made of a material that is easily deformed by the vacuum pressure and has the lowest stiffness. Even when the porous material 33 is filled in the vacuum space part 50, the conductive resistance sheet may preferably have the lowest stiffness, and the plate member and the side frame may preferably have the highest stiffness.

Figure 5:
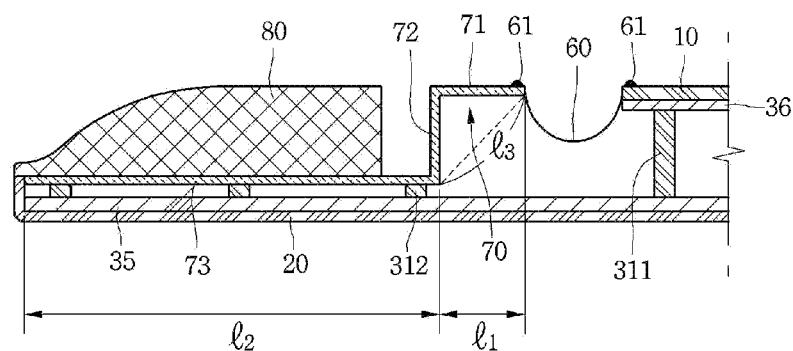
FIG. 5 is a view showing in detail a vacuum adiabatic body according to another embodiment.

FIG. 5 is a view showing in detail a vacuum adiabatic body according to another embodiment. The embodiment shown in FIG. 5 may be preferably applied to the door-side vacuum adiabatic body, and the description of the vacuum adiabatic body shown in FIG. 4b among the vacuum adiabatic bodies shown in FIG. 4 may be applied to parts not described in detail with reference to FIG. 5.

Referring to FIG. 5, the vacuum adiabatic body of the embodiment may include a first plate member 10, a second plate member 20, a conductive resistance sheet 60, and a side frame 70. The side frame 70 provides a path through which solid conduction heat passing through the conductive resistance sheet 60 passes. However, in the refrigerator, cold air may be reduced in a process in which it passes through the conductive resistance sheet 60, but can be sufficiently resisted while flowing along the side frame 70. The side frame 70 may be formed thinner than the first plate member 10 so as to resist the cold air passing through the conductive resistance sheet 60.

The side frame 70 is formed in a bent shape, and may be provided such that the height of an outer portion, i.e., an edge portion when viewed from the entire shape of the vacuum adiabatic body is lowered. The side frame 70 may be provided in a shape in which a gap part between the side frame 70 and the second plate member 20 is divided into a part having a high height and a part having a low height.

According to the above-described shape, the part at which the height of the side frame 70 is low can ensure a predetermined space as compared with another part at the exterior of the vacuum adiabatic body. Accordingly, it is possible to maximally ensure the internal volume of a product such as the refrigerator provided by the vacuum adiabatic body, to improve an adiabatic effect, and to sufficiently ensure functions of the product.

The side frame 70 includes a first mounting surface 71 on which the conductive resistance sheet 60 is mounted to be fastened to the side frame 70, a second mounting surface 73 on which an addition is mounted, and a connection part or wall 72 connecting the first and second mounting surfaces 71 and 73 to each other. The addition may include a door hinge, an adiabatic member, etc. The conductive resistance sheet 60 may be fastened to the first plate member 10 and the side frame 70 by sealing parts 61, and thus the vacuum state of a vacuum space part can be maintained.

The periphery of the second mounting surface 73 may be connected to an edge portion of the second plate member 20. In this case, the second mounting surface 73 and the second plate 20 may be connected to each other through welding. Therefore, it may be considered that the second mounting surface 73 is coupled at an edge portion of the vacuum adiabatic body.

A supporting unit includes support plates 35 and 36 and at least one bar 311 and 312 interposed between the support plates 35 and 36. The at least one bar 311 and 312 includes a first bar 311 for maintaining a gap between the first and second plate members 10 and 20, and a second bar 312 for maintaining a gap between the side frame 70 and the second plate member 20.

The second mounting surface 73 may be supported by the second bar 312. Specifically, the second bar 312 may be connected to a bottom surface of the second mounting surface 73. On the other hand, any separate support member may not be connected to a bottom surface of the first mounting surface 71.

That is, the first mounting surface 71 is connected to the connection part 72 to be supported by the second mounting surface 73. Therefore, a length L1 of the first mounting surface 71 may be formed shorter than a length L2 of the second mounting surface 73. The supporting unit is not provided at the bottom of the first mounting surface 71, and hence the length of the second mounting surface 73 may be formed longer, which is effective from the point of view of strength.

A vertical distance between the second mounting surface 73 and the second plate member 20 may be formed shorter than that between the first mounting surface 71 and the second plate member 20. Accordingly, it is possible to maximally ensure the internal volume of a product such as the refrigerator provided by the vacuum adiabatic body, to improve an adiabatic effect, and to sufficiently ensure functions of the product.

Meanwhile, a force in the direction of the vacuum space part of the vacuum adiabatic body is applied to the side frame 70 by a difference in atmospheric pressure between the vacuum space part and the atmosphere, and hence drooping of the first mounting surface 71 may occur. Therefore, the length of the first mounting surface 71 is to be limited to a predetermined value or less.

However, the first mounting surface 71 is to ensure a space in which the conductive resistance sheet 60 is to be welded, and therefore, the length the first mounting surface 71 is to have a predetermined value or more. When welding is performed, the conductive resistance sheet 60 is adhered closely to the first mounting surface 71 using a jig and then welded to the first mounting surface 71.

The connection part 72, as shown in FIG. 5, may extend in a direction perpendicular to the second mounting surface 73, but the present disclosure is not limited to such a configuration. For example, the connection part 72 may be disposed to form an acute or obtuse angle with the second mounting surface 73.

The side frame 70 may further include a reinforcing member (not shown) for connecting the second mounting surface 73 and the connection part 72 to each other so as to prevent warp thereof. The reinforcing member (not shown) may connect an upper end of the connection part 72 and the second mounting part 73 to each other.

Hereinafter, a design of a thickness of the side frame 70 and a length of the second mounting surface 73, which satisfy a deformation condition, will be described. In addition, the connection part 72 may not be provided or may be formed to have a small size, and therefore, a distance L3 from an inner end of the first mounting surface 71 to an inner end of the second mounting surface 73 is defined as the length of the first mounting surface 71. The length L3 of the first mounting surface 71 may correspond to the thickness of the vacuum adiabatic body.

Figure 6:
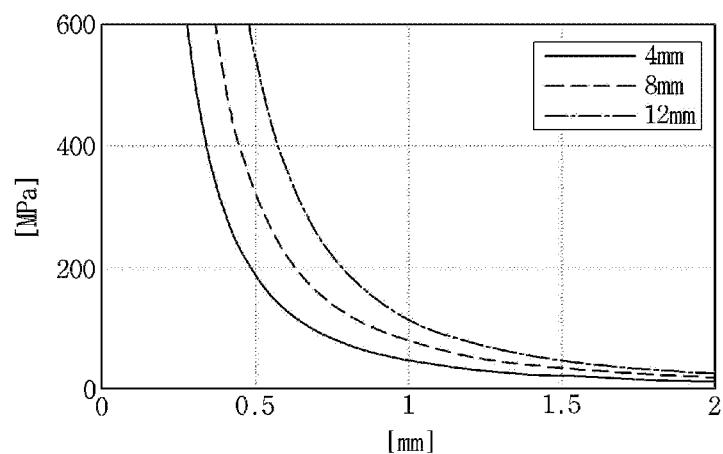
FIG. 6 illustrates graphs showing minimum thicknesses of a side frame with respect to limiting stresses of the side frame.

FIG. 6 illustrates graphs showing minimum thicknesses of the side frame with respect to limiting stresses of the side frame. Referring to FIG. 6, the vertical axis represents limiting stresses of the side frame 70, and the horizontal axis represents minimum thicknesses of the side frame 70 with respect to the limiting stresses of the side frame 70. That is, as the limiting stress is set to be higher in a design of the side frame 70, the minimum thickness of the side frame 70 becomes smaller.

For example, when the limiting stress is set to a rupture stress in the design of the side frame 70, the minimum thickness becomes smaller than that when the limiting stress is set to a yield stress. This is because the rupture stress is larger than the yield stress.

In addition, as the length L3 of the first mounting surface 71 of the side frame 70 becomes longer, the graphs move to the right side. That is, it can be seen through the graphs that, if the side frame 70 is designed to have the same limiting stress, the minimum thickness of the side frame 70 is to be increased.

The graphs are analyzed using the side frame 70 made of stainless steel such as STS304 having a low thermal conductivity and a high strength. The side frame 70 may be made of titanium, iron, or the like. However, in this case, shapes of graphs are hardly different from those of the graphs shown in FIG. 6.

Figure 7:
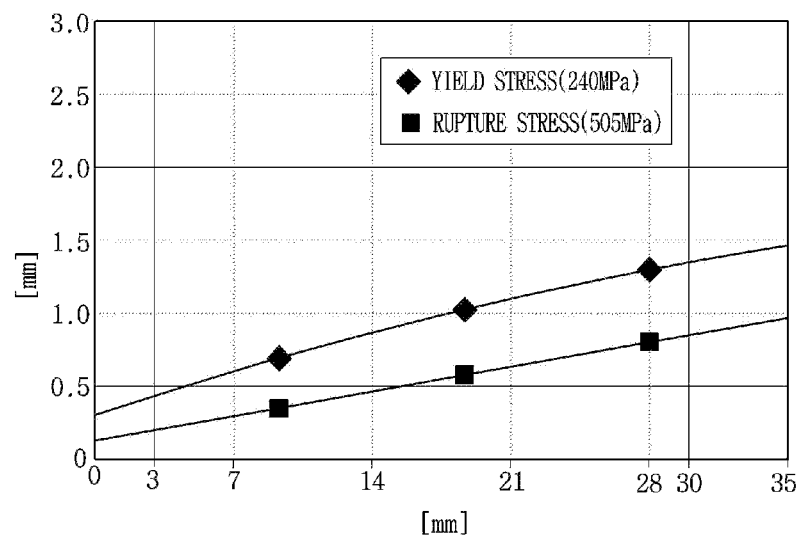
FIG. 7 illustrates graphs showing relationships between lengths of a first mounting surface and minimum thicknesses of the side frame.

FIG. 7 illustrates graphs showing relationships between lengths of the first mounting surface and minimum thicknesses of the side frame. Referring to FIG. 7, the horizontal axis represents lengths L3 of the first mounting surface 71, and the vertical axis represents minimum thicknesses of the side frame 70. It can be seen that the stress design reference is satisfied when the minimum thickness of the side frame 70 is increased as the length L3 of the first mounting surface 71 is increased.

When the side frame 70 is designed based on a yield stress (240 MPa), a graph is disposed over that when the side frame 70 is designed based on a rupture stress (505 MPa). That is, when lengths L3 of the first mounting surface 71 are the same, a minimum thickness of the side frame 70 when the side frame 70 is designed based on the yield stress is further increased than that of the side frame 70 when the side frame 70 is designed based on the rupture stress.

By using the graphs, a minimum thickness of the side frame with respect to a length L3 of the first mounting surface 71 may be determined according to the stress design reference. For example, when the length L3 of the first mounting surface 71 is 6 mm, the minimum thickness of the side frame 70 is to be designed to be 0.35 mm or more so as to prevent rupture of the side frame 70.

It may be defined that the length L3 of the first mounting surface 71 is x and the minimum thickness of the side frame 70 is y. When the side frame 70 is designed based on the yield stress, the range of minimum thicknesses of the side frame 70 may be designed to satisfy an inequality of $y>0.034\times x+0.287$. This represents a graph disposed at a lower portion on the drawing.

When the side frame 70 is designed based on the rupture stress, the range of minimum thicknesses of the side frame 70 may be designed to satisfy an inequality of $y>0.023\times x+0.2$. This represents a graph disposed at an upper portion on the drawing. Thus, it can be seen that, when the side frame 70 is designed based on the rupture stress, the range of minimum thicknesses of the side frame 70 is wider.

Meanwhile, the minimum thickness of the side frame 70 may be designed to be equal to or greater than 0.5 mm and equal to or smaller than 2.0 mm. The range is a range for satisfying strength and weight conditions of the side frame 70. Also, the length L3 of the first mounting surface 71 may be designed to be equal to or greater than 3 mm and equal to or smaller than 30 mm.

Figure 8:
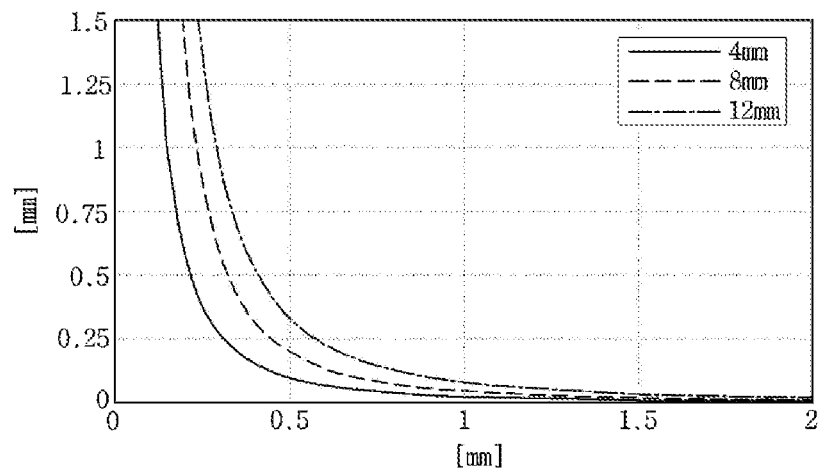
FIG. 8 illustrates graphs showing relationships between thicknesses of the side frame and deformations of the side frame.

FIG. 8 illustrates graphs showing relationships between thicknesses of the side frame and deformations of the side frame. Referring to FIG. 8, as the thickness of the side frame 70 is decreased, the deformation of the side frame 70 is increased. Also, since the graphs move to the right side as the length L3 of the first mounting surface 71 is increased, it can be seen that, when the thickness of the side frame 70 is constant, the deformation of the side frame 70 is increased as the length L3 of the first mounting surface 71 is increased.

The deformation of the side frame 70 may cause deformation of the conductive resistance sheet 60, and it is highly likely that the deformation of the side frame 70 will cause a problem when the side frame 70 is fastened to other parts. Hence, the side frame 70 is to be designed such that the deformation of the side frame 70 is within a certain range.

Figure 9:
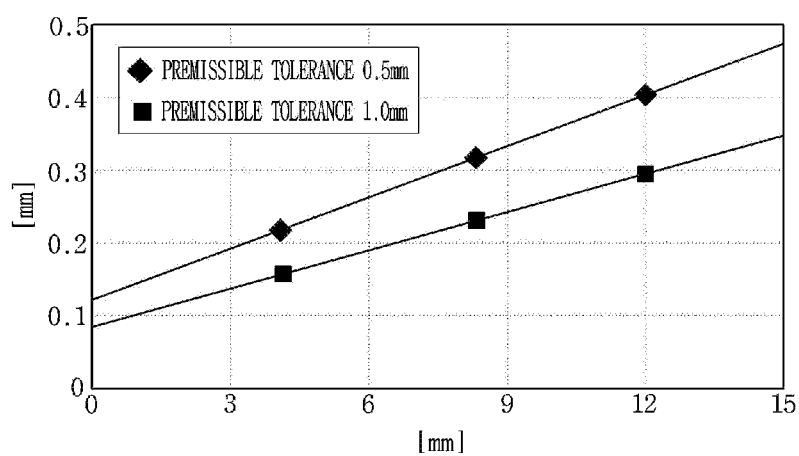
FIG. 9 illustrates graphs showing relationships between lengths of the first mounting surface and minimum thicknesses of the side frame.

FIG. 9 illustrates graphs showing relationships between lengths of the first mounting surface and minimum thicknesses of the side frame. Referring to FIG. 9, the horizontal axis represents lengths L3 of the first mounting surface 71, and the vertical axis represents minimum thicknesses of the side frame 70. Here, it may be defined that the length L3 of the first mounting surface 71 is x and the minimum thickness of the side frame 70 is y. Two graphs represent when a permissible tolerance is 0.5 mm and when a permissible tolerance is 1 mm, respectively.

Specifically, a graph disposed at an upper portion on the drawing is a graph representing when the permissible tolerance is 0.5 mm, and satisfies an inequality of $y>0.0238\times x+0.12$. A graph disposed at a lower portion on the drawing is a graph representing when the permissible tolerance is 1 mm, and satisfies an inequality of $y>0.0175\times x+0.0833$.

Therefore, as the permissible tolerance is decreased, the minimum thickness of the side frame 70 is to be designed to be increased. For example, when the length L3 of the first mounting surface 71 is 12 mm, the minimum thickness of the side frame 70 is to be designed to be 0.3 mm or more so as to control the permissible tolerance to be within 1 mm. Also, the minimum thickness of the side frame 70 is to be designed to be 0.4 mm or more so as to control the permissible tolerance to be within 0.5 mm.

Hereinafter, a vacuum pressure preferably determined depending on an internal state of the vacuum adiabatic body will be described. As already described above, a vacuum pressure is to be maintained inside the vacuum adiabatic body so as to reduce heat transfer. At this time, it will be easily expected that the vacuum pressure is preferably maintained as low as possible so as to reduce the heat transfer.

The vacuum space part 50 may resist the heat transfer by applying only the supporting unit 30. Alternatively, the porous material 33 may be filled together with the supporting unit in the vacuum space part 50 to resist the heat transfer. Alternatively, the vacuum space part may resist the heat transfer not by applying the supporting unit but by applying the porous material 33.

Figure 10:
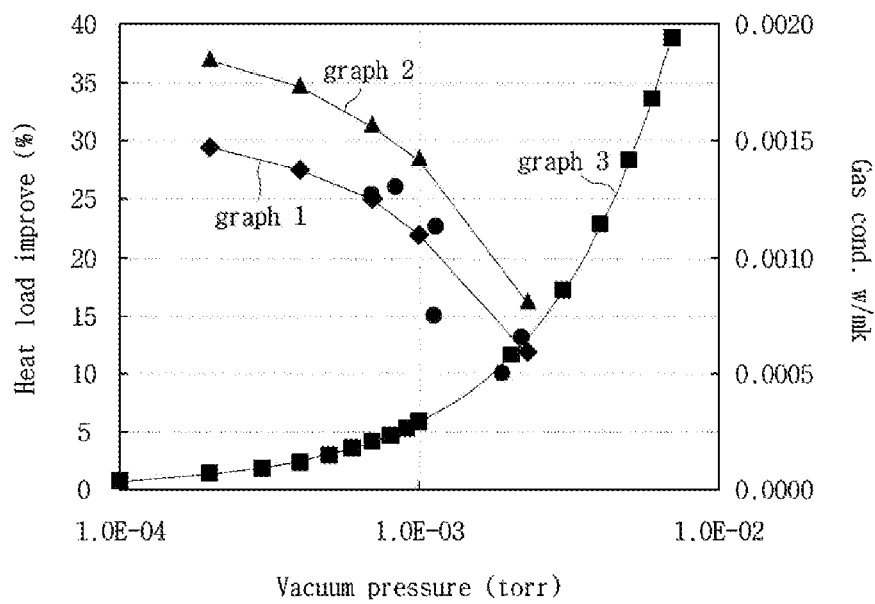
FIG. 10 illustrates graphs showing changes in adiabatic performance and changes in gas conductivity with respect to vacuum pressures by applying a simulation.

The case where only the supporting unit is applied will be described. FIG. 10 illustrates graphs showing changes in adiabatic performance and changes in gas conductivity with respect to vacuum pressures by applying a simulation. Referring to FIG. 10, it can be seen that, as the vacuum pressure is decreased, i.e., as the vacuum degree is increased, a heat load in the case of only the main body (Graph 1) or in the case where the main body and the door are joined together (Graph 2) is decreased as compared with that in the case of the typical product formed by foaming polyurethane, thereby improving the adiabatic performance. However, it can be seen that the degree of improvement of the adiabatic performance is gradually lowered. Also, it can be seen that, as the vacuum pressure is decreased, the gas conductivity (Graph 3) is decreased.

However, it can be seen that, although the vacuum pressure is decreased, the ratio at which the adiabatic performance and the gas conductivity are improved is gradually lowered. Therefore, it is preferable that the vacuum pressure is decreased as low as possible. However, it takes long time to obtain excessive vacuum pressure, and much cost is consumed due to excessive use of a getter. In the embodiment, an optimal vacuum pressure is proposed from the above-described point of view.

Figure 11:
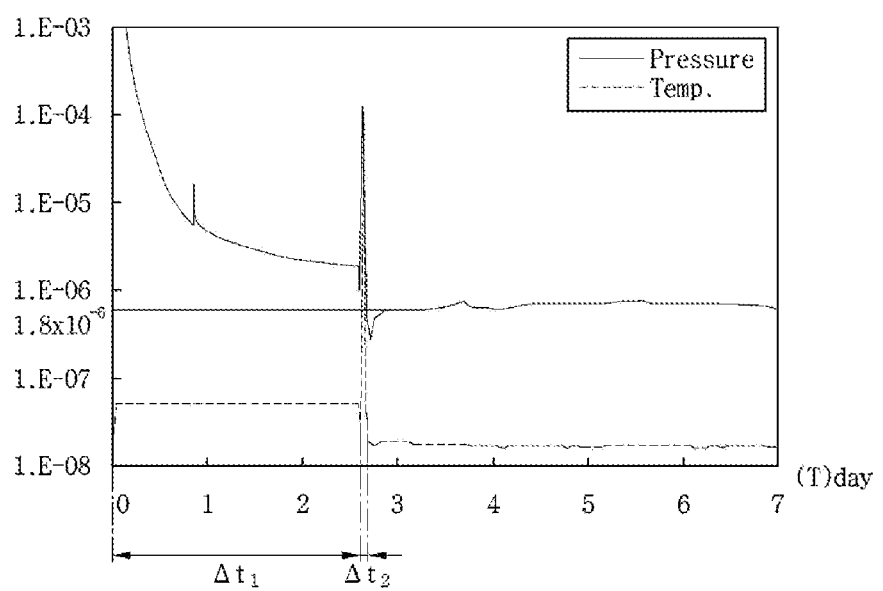
FIG. 11 illustrates graphs obtained by observing, over time and pressure, a process of exhausting the interior of the vacuum adiabatic body when a supporting unit is used.

FIG. 11 illustrates graphs obtained by observing, over time and pressure, a process of exhausting the interior of the vacuum adiabatic body when the supporting unit is used. Referring to FIG. 11, in order to create the vacuum space part 50 to be in the vacuum state, a gas in the vacuum space part 50 is exhausted by a vacuum pump while evaporating a latent gas remaining in the parts of the vacuum space part 50 through baking. However, if the vacuum pressure reaches a certain level or more, there exists a point at which the level of the vacuum pressure is not increased any more ($\Delta t1$).

After that, the getter is activated by disconnecting the vacuum space part 50 from the vacuum pump and applying heat to the vacuum space part 50 ($\Delta t2$). If the getter is activated, the pressure in the vacuum space part 50 is decreased for a certain period of time, but then normalized to maintain a vacuum pressure of a certain level. The vacuum pressure that maintains the certain level after the activation of the getter is approximately $1.8 \times 10^{\wedge}(-6)$ Torr. In the embodiment, a point at which the vacuum pressure is not substantially decreased any more even though the gas is exhausted by operating the vacuum pump is set to the lowest limit of the vacuum pressure used in the vacuum adiabatic body, thereby setting the minimum internal pressure of the vacuum space part 50 to $1.8 \times 10^{\wedge}(-6)$ Torr.

Figure 12:
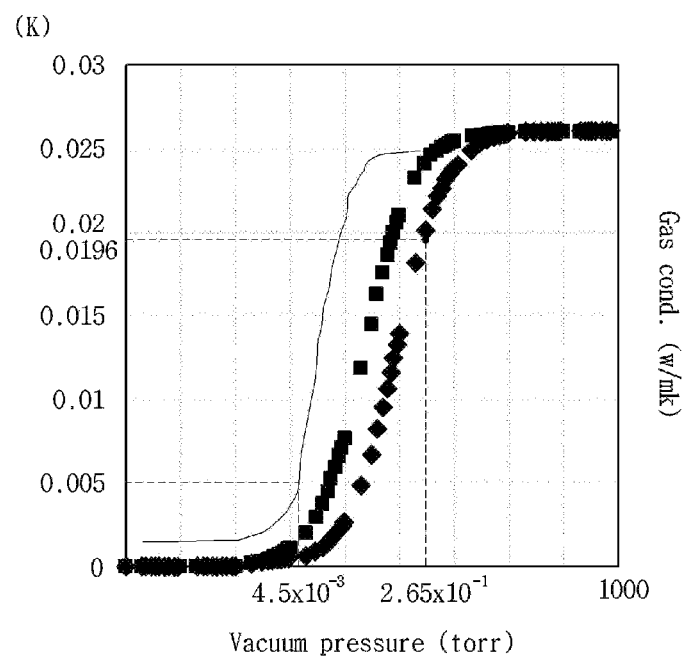
FIG. 12 illustrates graphs obtained by comparing vacuum pressures and gas conductivities.

FIG. 12 illustrates graphs obtained by comparing vacuum pressures and gas conductivities. Referring to FIG. 12, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm.

The gap in the vacuum space part 50 is defined as follows. When the radiation resistance sheet 32 exists inside vacuum space part 50, the gap is a distance between the radiation resistance sheet 32 and the plate member adjacent thereto. When the radiation resistance sheet 32 does not exist inside vacuum space part 50, the gap is a distance between the first and second plate members.

It can be seen that, since the size of the gap is small at a point corresponding to a typical effective heat transfer coefficient of 0.0196 W/mK, which is provided to an adiabatic material formed by foaming polyurethane, the vacuum pressure is $2.65 \times 10^{\wedge}(-1)$ Torr even when the size of the gap is 2.76 mm. Meanwhile, it can be seen that the point at which reduction in adiabatic effect caused by gas conduction heat is saturated even though the vacuum pressure is decreased is a point at which the vacuum pressure is approximately $4.5 \times 10^{\wedge}(-3)$ Torr. The vacuum pressure of $4.5 \times 10^{\wedge}(-3)$ Torr can be defined as the point at which the reduction in adiabatic effect caused by gas conduction heat is saturated. Also, when the effective heat transfer coefficient is 0.1 W/mK, the vacuum pressure is $1.2 \times 10^{\wedge}(-2)$ Torr.

When the vacuum space part 50 is not provided with the supporting unit but provided with the porous material, the size of the gap ranges from a few micrometers to a few hundredths of micrometers. In this case, the amount of radiation heat transfer is small due to the porous material even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0 \times 10^{\wedge}(-4)$ Torr.

Also, the vacuum pressure at the point at which the reduction in adiabatic effect caused by gas conduction heat is saturated is approximately $4.7 \times 10^{\wedge}(-2)$ Torr. Also, the pressure where the reduction in adiabatic effect caused by gas conduction heat reaches the typical effective heat transfer coefficient of 0.0196 W/mK is 730 Torr. When the supporting unit and the porous material are provided together in the vacuum space part, a vacuum pressure may be created and used, which is middle between the vacuum pressure when only the supporting unit is used and the vacuum pressure when only the porous material is used.

The vacuum adiabatic body proposed in the present disclosure may be preferably applied to refrigerators. However, the application of the vacuum adiabatic body is not limited to the refrigerators, and may be applied in various apparatuses such as cryogenic refrigerating apparatuses, heating apparatuses, and ventilation apparatuses.

According to the present disclosure, the vacuum adiabatic body can be industrially applied to various adiabatic apparatuses. The adiabatic effect can be enhanced, so that it is possible to improve energy use efficiency and to increase the effective volume of an apparatus.

What is claimed is:

1. A vacuum adiabatic body comprising:
   a first plate to have a first temperature;
   a second plate to have a second temperature different from the first temperature;
   a vacuum space to be provided between the first plate and the second plate, and the vacuum space to be provided in a vacuum state, the vacuum space having a thickness in a first direction;
   a conductive resistance sheet configured to resist heat transfer between the first plate and the second plate, a portion of the conductive resistance sheet being connected to at least one of the first plate or the second plate; and a side frame having a first mounting surface connected to the first plate and a portion extending in the first direction,
wherein the side frame includes a portion defining at least one portion of a wall for the vacuum space.

2. The vacuum adiabatic body according to claim 1, wherein the side frame includes a connection wall connecting the first mounting surface and a second mounting surface to each other, the connection wall is provided to a main portion of the vacuum adiabatic body without being provided to an edge portion of the vacuum adiabatic body, wherein the main portion of the vacuum adiabatic body is disposed at an inner side of the vacuum adiabatic body than the edge portion of the vacuum adiabatic body.

3. The vacuum adiabatic body according to claim 1, wherein the side frame having the first mounting surface connected to the first plate,
wherein the first mounting surface is provided to a main portion of the vacuum adiabatic body without being provided to an edge portion of the vacuum adiabatic body, wherein the main portion of the vacuum adiabatic body is disposed at an inner side of the vacuum adiabatic body than the edge portion of the vacuum adiabatic body.

4. The vacuum adiabatic body according to claim 1, wherein the side frame having a second mounting surface connected to the second plate,
wherein the second mounting surface is provided to an edge portion of the vacuum adiabatic body without being provided to a main portion of the vacuum adiabatic body, wherein the main portion of the vacuum adiabatic body is disposed at an inner side of the vacuum adiabatic body than the edge portion of the vacuum adiabatic body.

5. The vacuum adiabatic body according to claim 1, further comprising a radiation resistance sheet configured to reduce heat radiation between the first plate and the second plate through the vacuum space.

6. A vacuum adiabatic body comprising:
a first plate to have a first temperature;
a second plate to have a second temperature different from the first temperature;
a vacuum space to be provided between the first plate and the second plate, and the vacuum space to be provided in a vacuum state, the vacuum space having a thickness in a first direction;
a conductive resistance sheet configured to resist heat transfer between the first plate and the second plate, a portion of the conductive resistance sheet being connected to at least one of the first plate or the second plate; and
a side frame having a first mounting surface connected to the first plate and a portion extending in the first direction,
wherein the side frame includes a second mounting surface and a connection wall connecting the first mounting surface and the second mounting surface to each other, and
wherein the side frame includes a portion defining at least one portion of a wall for the vacuum space.

7. The vacuum adiabatic body according to claim 6, wherein a heat conduction distance of the side frame is be provided longer than a linear distance of the first and second plate such that a heat conduction transferring via the side frame is reduced.

8. The vacuum adiabatic body according to the claim 6, wherein the first and second mounting surface extends in a different direction from each other.

9. The vacuum adiabatic body according to the claim 8, wherein the first and second mounting surface extends in an opposite direction from each other.

10. The vacuum adiabatic body according to the claim 6, wherein the first mounting surface have a different height from the second mounting surface.

11. The vacuum adiabatic body according to the claim 10, wherein the first mounting surface have a higher height from the second mounting surface.

12. The vacuum adiabatic body according to the claim 6, comprising a support configured to maintain a distance between the first plate and second plate, wherein the first mounting surface is not supported by the support but the second mounting surface is supported by the support.

13. The vacuum adiabatic body according to claim 6, wherein a portion of the side frame are connected with a portion of the conductive resistance sheet, after the side frame and the conductive resistance sheet are manufactured respectively so that the side frame and the conductive resistance sheet may be provided as a separate component each other.

14. The vacuum adiabatic body according to claim 13, wherein the other portion of the side frame is connected to the second plate.

15. The vacuum adiabatic body according to claim 13, wherein the other portion of the conductive resistance sheet is connected to the first plate.

16. A vacuum adiabatic body comprising:
a first plate to have a first temperature;
a second plate to have a second temperature different from the first temperature;
a vacuum space to be provided between the first plate and the second plate, and the vacuum space to be provided in a vacuum state, the vacuum space having a thickness in a first direction;
a conductive resistance sheet configured to resist heat transfer between the first plate and the second plate, a portion of the conductive resistance sheet being connected to at least one of the first plate or the second plate;
a side frame having a first mounting surface connected to the first plate and a portion extending in the first direction;
wherein the side frame includes a portion having a less thickness than at least one of the first plate or the second plate such that a heat conduction transferring via the side frame is reduced, and
wherein the side frame includes a portion defining at least one portion of a wall for the vacuum space.

17. The vacuum adiabatic body according to claim 6, further comprising a radiation resistance sheet configured to reduce heat radiation between the first plate and the second plate through the vacuum space.

18. The vacuum adiabatic body according to claim 16, further comprising a radiation resistance sheet configured to reduce heat radiation between the first plate and the second plate through the vacuum space.

19. A vacuum adiabatic body comprising:
a first plate to have a first temperature;
a second plate to have a second temperature different from the first temperature;

a vacuum space to be provided between the first plate and the second plate, and the vacuum space to be provided in a vacuum state, the vacuum space having a thickness in a first direction;

a conductive resistance sheet configured to resist heat transfer between the first plate and the second plate, a portion of the conductive resistance sheet being connected to at least one of the first plate or the second plate; and a side frame having a first mounting surface connected to the first plate and a portion extending in the first direction, wherein the side frame has a bent shape and a heat conduction distance of the side frame is provided longer than a linear distance of the first and second plate such that a heat conduction transferring via the side frame is reduced, and wherein the side frame includes a portion defining at least one portion of a wall for the vacuum space.

20. The vacuum adiabatic body according to claim 19, further comprising a radiation resistance sheet configured to reduce heat radiation between the first plate and the second plate through the vacuum space.

\* \* \* \* \*